United States Patent [19]

Budd

[11] Patent Number: 5,098,513
[45] Date of Patent: Mar. 24, 1992

[54] APPARATUS FOR JOINING MEMBERS MADE OF THERMOPLASTIC MATERIAL AND HEATING DEVICE FOR USE THEREWITH

[76] Inventor: Theodore R. Budd, 10051 Humphrey Rd., Cincinnati, Ohio 45242

[21] Appl. No.: 407,883

[22] Filed: Sep. 15, 1989

[51] Int. Cl.⁵ ............................................. B29C 65/00
[52] U.S. Cl. .................................. 156/502; 156/304.6; 156/308.2; 156/381; 156/382
[58] Field of Search .................... 156/502, 503, 304.6, 156/304.1, 304.2, 381, 382, 308.2, 309.9

[56] References Cited

U.S. PATENT DOCUMENTS 3,959,057  5/1976  Smith ........................ 156/500 X
4,390,578  6/1983  Brooks ..................... 156/309.9 X Primary Examiner—David A. Simmons
Assistant Examiner—James J. Engel, Jr.
Attorney, Agent, or Firm—Kinney & Schenk

[57] ABSTRACT

A method and apparatus for joining members made of thermoplastic material are provided wherein cut edges of such members and portions of the members adjoining the edges are heated to a selected temperature to define plasticized edge portions and the plasticized edge portions are moved to bring the edges in contact with each other while shielding same from ambient air to thereby enable fusion of the plasticized edge portions with minimum flashing and carbonization of the thermoplastic material. A heating device for use with the apparatus and method of this invention is also provided.

7 Claims, 4 Drawing Sheets

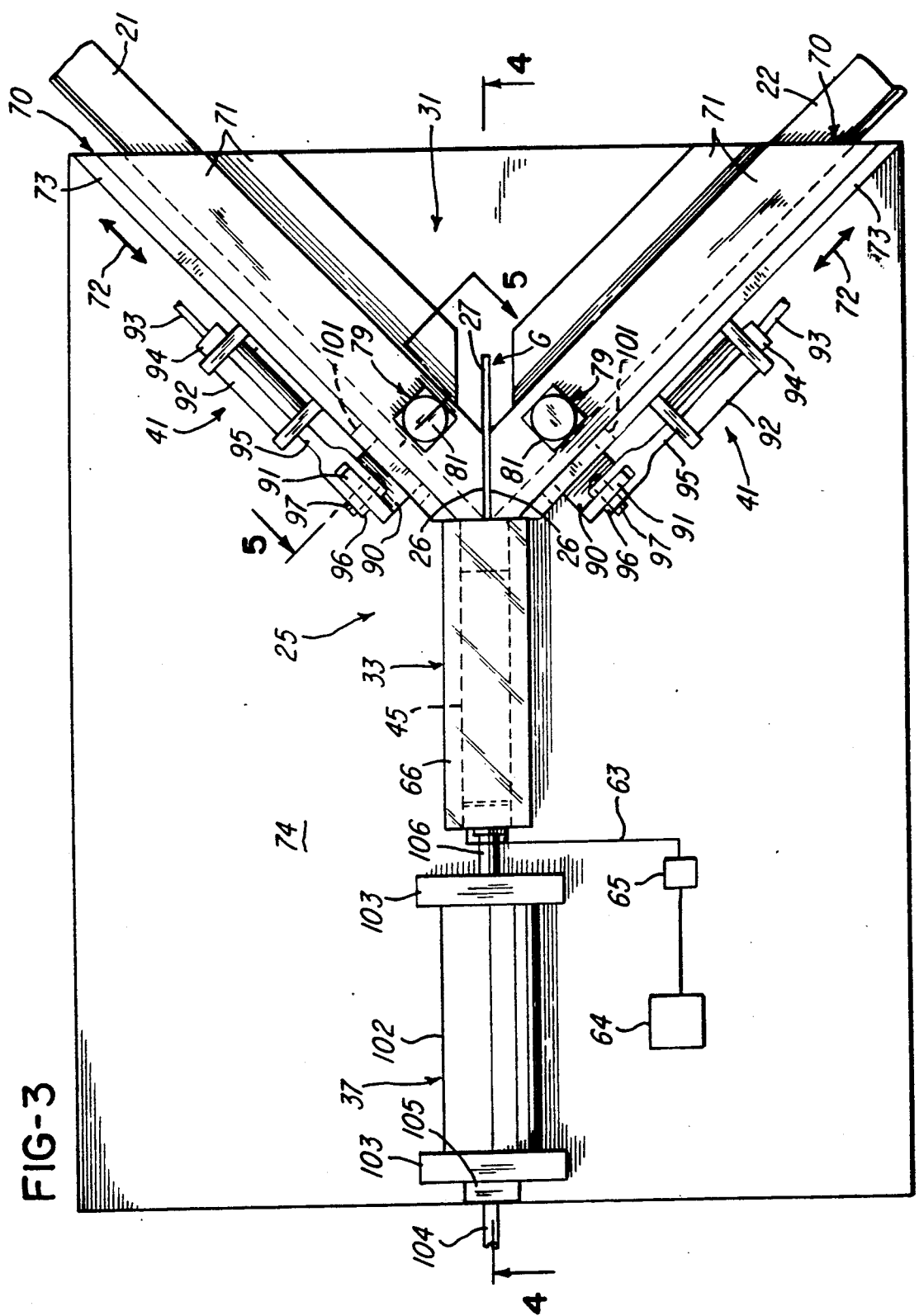

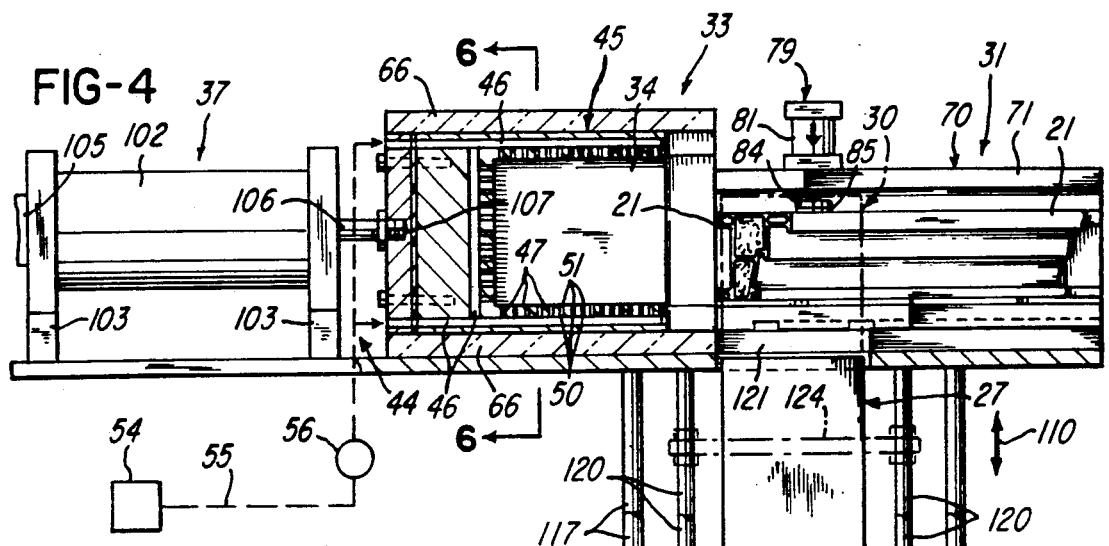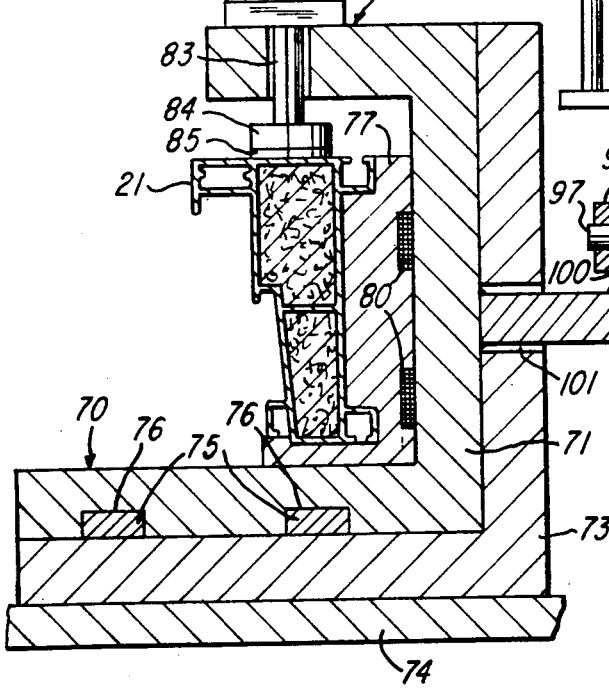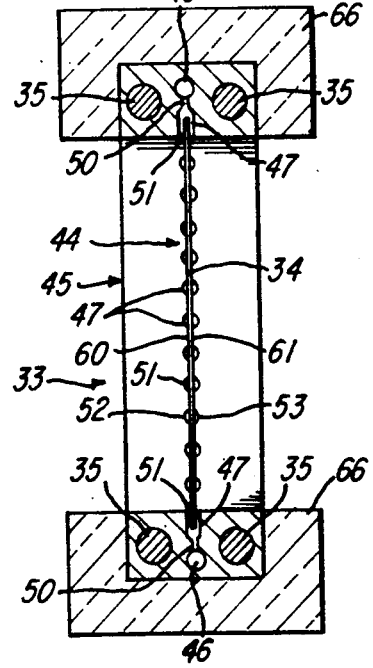

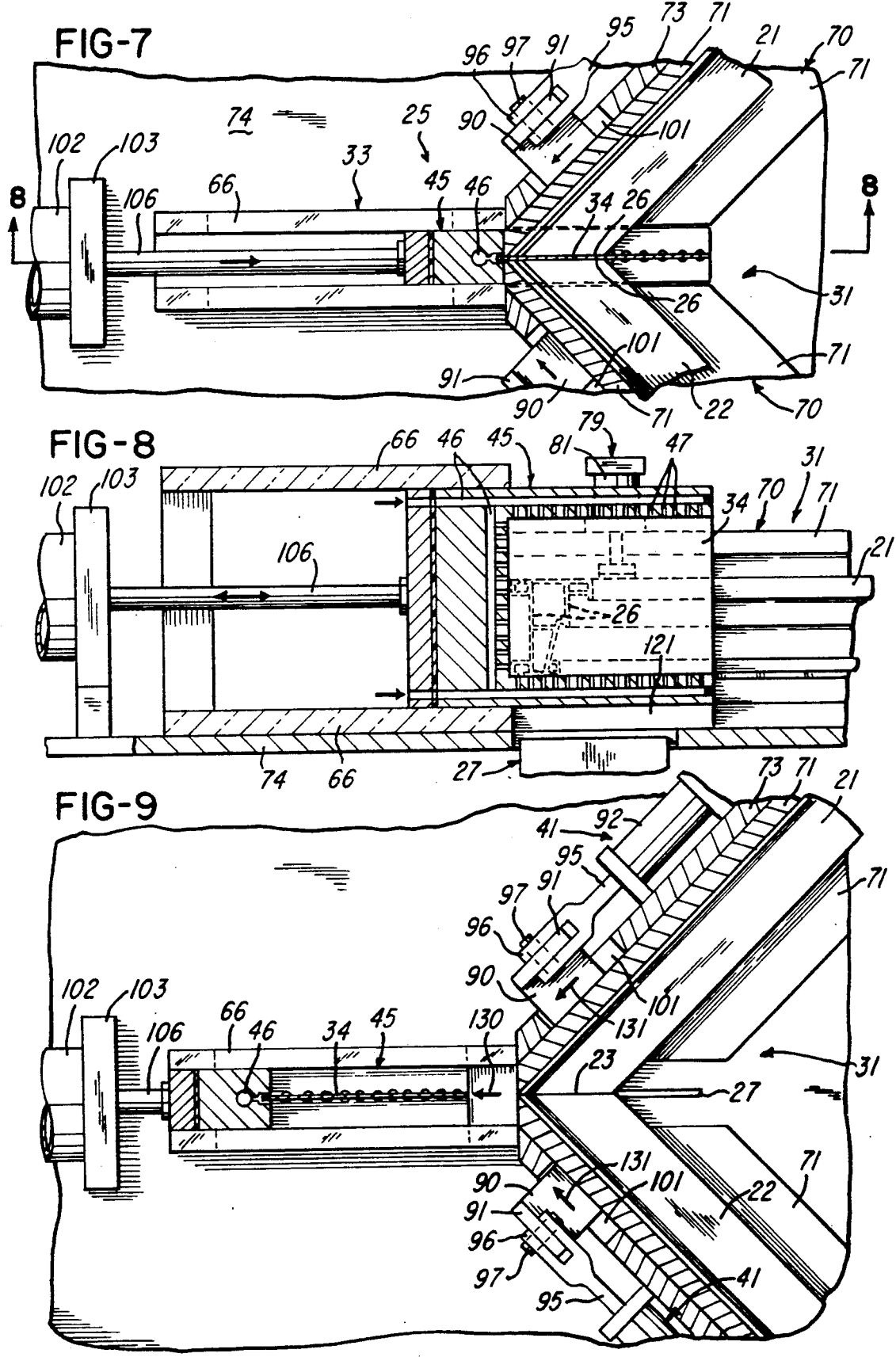

APPARATUS FOR JOINING MEMBERS MADE OF THERMOPLASTIC MATERIAL AND HEATING DEVICE FOR USE THEREWITH

BACKGROUND OF THE INVENTION

1. Field of the Invention

This invention relates to joining by fusion of members made of thermoplastic material and in particular to the joining by fusion of thermoplastic members comprising frames for windows, doors, and like structures.

2. Prior Art Statement

It is known in the art to provide a method of joining by fusion members made of thermoplastic material such as thermoplastic frame members for windows, doors, and the like which carry and support glass panes, screens, and the like. In particular, a known method of joining such members comprises the steps of forming edge means on the members, aligning and clamping said edge means and members against an alignment plate, withdrawing the plate to define a controlled gap therebetween, heating a blade to a predetermined temperature and inserting same in the gap, urging the said edge means against the blade in a controlled manner to heat same and portions of the members adjoining the said edge means and define plasticized edge portions, retracting the blade, moving the members to place said plasticized edge portions against each other in a controlled manner to a preset position to provide fusion thereof, and holding the members and plasticized edge portions stationary at the preset position while allowing cooling and solidification thereof.

It is also known in the art to provide an apparatus for joining members made of thermoplastic material and having edge means to be joined formed on said members, with said apparatus comprising an alignment plate adapted to be supported in an alignment position, carrier means for said members, said carrier means enabling aligning and clamping the said edge means and members against the alignment plate, means for withdrawing the plate to define a controlled gap therebetweeen, a blade for heating the said edge means, means for heating the blade to a predetermined temperature, means for inserting the blade in the gap and retracting same therefrom, positioning means for said carrier means enabling urging of the said edge means against the blade in a controlled manner to enable heating same and portions of the members adjoining the said edge means and define plasticized edge portions, the said means for inserting and retracting being adapted to retract the blade upon heating thereof, said positioning means also serving to move said carrier means and members and their plasticized edge portions against each other in a controlled manner to a preset position to provide fusion thereof, and said carrier means and positioning means being adapted to hold said members and plasticized edge portions stationary at said preset position while allowing cooling and solidification thereof.

It is also known in the art to provide a device for heating edge means of members made of thermoplastic material and portions of said members adjoining said edge means upon urging said edge means against said device to define plasticized edge portions which are adapted to be joined by fusion, said device comprising, a support, a blade carried by said support, and means carried by said support for heating said blade to a predetermined temperature to enable heating said edge means and said portions of said members adjoining said edge means upon urging said edge means against said blade, said plasticized edge portions being adapted to be joined by said fusion upon moving same against each other and allowing cooling thereof.

However, previous methods, apparatus, and devices including the ones disclosed above have deficiencies which preclude joining of thermoplastic members by fusion in a fast and efficient manner and which preclude such joining of such members with minimum flashing and carbonization of the thermoplastic material comprising same.

SUMMARY OF THE INVENTION

This invention provides a new method and apparatus which substantially overcomes the above-mentioned deficiencies.

This invention also provides a new device for use with the above-mentioned method and apparatus.

It is a feature of this invention to provide a new method for joining members made of thermoplastic material comprising the steps of, forming edge means on said members, aligning and clamping the said edge means and members against an alignment plate, withdrawing said plate to define a controlled gap therebetween, heating a blade to a predetermined temperature and inserting same in said gap, urging said edge means against said blade in a controlled manner to heat same and portions of said members adjoining said edge means and define plasticized edge portions, retracting said blade, moving said members to place said plasticized edge portions against each other in a controlled manner to a preset position to provide fusion thereof, and holding said members and plasticized edge portions stationary at said preset position while allowing cooling and solidification thereof.

In accordance with one embodiment of this invention, the above-mentioned method comprises a further step of shielding said plasticized edge portions from ambient air during said urging and moving steps, said step of shielding enabling faster fusion of said plasticized edge portions with minimum flashing and carbonization of said thermoplastic material.

Another feature of this invention is to provide a new apparatus for joining members made of thermoplastic material and having edge means to be formed on said members, said apparatus comprising, an alignment plate adapted to be supported in an alignment position, carrier means for said members, said carrier means enabling aligning and clamping said edge means and members against said alignment plate, means for withdrawing said plate to define a controlled gap therebetween, a blade for heating said edge means, means for heating said blade to a predetermined temperature, means for inserting said blade in said gap and retracting same therefrom, positioning means for said carrier means enabling urging of said edge means against said blade in a controlled manner to enable heating same and portions of said members adjoining said edge means and define plasticized edge portions, said means for inserting and retracting being adapted to retract said blade upon heating said blade and defining said plasticized edge portions, said positioning means also serving to move said carrier means and members and their plasticized edge portions against each other in a controlled manner to a preset position to provide fusion thereof, and said carrier means and positioning means being adapted to hold said members and plasticized edge portions stationary at said preset position while allowing cooling and solidification thereof.

In accordance with one embodiment of the new apparatus of this invention such apparatus further comprises means for shielding said plasticized edge portions from ambient air during said urging and moving, said shielding from ambient air employing said shielding means enabling fusion of said plasticized edge portions with minimum flashing and carbonization of said thermoplastic material.

Another feature of this invention is to provide a new device for heating edge means of members made of thermoplastic material and portions of said members adjoining said edge means upon urging said edge means against said device to define plasticized edge portions which are adapted to be joined by fusion, said device comprising a support, a blade carried by said support, and means carried by said support for heating said blade to a predetermined temperature to enable heating said edge means and said portions of said members adjoining said edge means upon urging said edge means against said blade, said plasticized edge portions being adapted to be joined by fusion upon moving same against each other and allowing cooling thereof.

In accordance with one embodiment of the above-mentioned new device such device comprises means for shielding said plasticized edge portions from ambient air during said urging and moving, said shielding from ambient air employing said shielding means enabling fusion of said plasticized edge portions with minimum flashing and carbonization of said thermoplastic material.

Accordingly, it is an object of this invention to provide a new method of joining members made of thermoplastic material with the method of this invention having one or more of the novel features as set forth above or hereinafter shown or described.

Another object of this invention is to provide a new apparatus for joining members made of thermoplastic material with the apparatus of this invention having one or more of the novel features as set forth above or hereinafter shown or described.

Another object of this invention is to provide a new heating device for use with the method and apparatus of this invention with such device of this invention having one or more of the novel features as set forth above or hereinafter shown or described.

Other features, objects, uses, and advantages of this invention are apparent from a reading of this description which proceeds with reference to the accompanying drawings forming a part thereof.

BRIEF DESCRIPTION OF THE DRAWINGS

The accompanying drawings show present preferred embodiments of this invention, in which

FIG. 3 is a plan view illustrating one exemplary embodiment of the apparatus and method of this invention;

FIG. 4 is a view taken essentially on the line 4—4 of FIG. 3;

FIG. 5 is a view taken essentially on the line 5—5 of FIG. 3;

FIG. 6 is a view taken essentially on the line 6—6 of FIG. 4;

FIG. 7 is a fragmentary plan view similar to the central portion of FIG. 3 illustrating a pair of thermoplastic members being urged against a heated blade;

FIG. 8 is a fragmentary view taken essentially on the line 8—8 of FIG. 7; and

FIG. 9 is a view similar to FIG. 7 illustrating the heated blade in its retracted position and the thermoplastic members which are being joined urged together while allowing cooling thereof.

DESCRIPTION OF THE PREFERRED EMBODIMENTS

Figure 1:
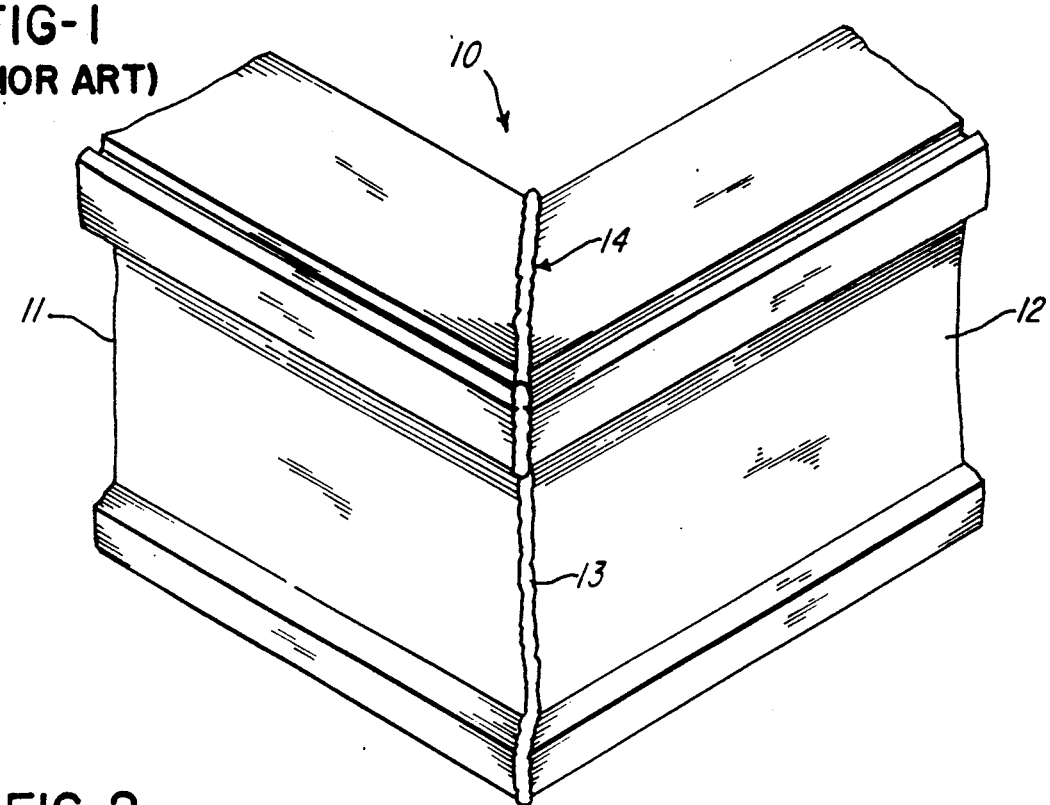
FIG. 1 is a fragmentary isometric view illustrating a pair of members of the prior art made of thermoplastic material and defining the corner portion of an exemplary window frame and particularly illustrating the flashing that is present due to the utilization of prior art apparatus and methods to join such members.

While the various features of this invention are hereinafter illustrated and described as being particularly adapted to provide a method and apparatus for joining members made of thermoplastic material and wherein such members may comprise window frames, door frames, and like structures, it is to be understood that the various features of this invention can be utilized singly or in various combinations using techniques known in the art to provide or make other products.

Therefore, this invention is not to be limited to only the embodiments illustrated in the drawings, because the drawings are merely utilized to illustrate certain ones of the wide variety of uses of this invention.

Reference is now made to FIG. 1 of the drawings which illustrates a prior art structure which has been joined utilizing prior art apparatus, methods, and teachings and such structure is designated generally by the reference numeral 10. The structure 10 is comprised of a pair of members 11 and 12 which have been joined to define a fused corner joint 13 and it will be seen that such joint has substantial flashing as shown at 14.

Figure 2:
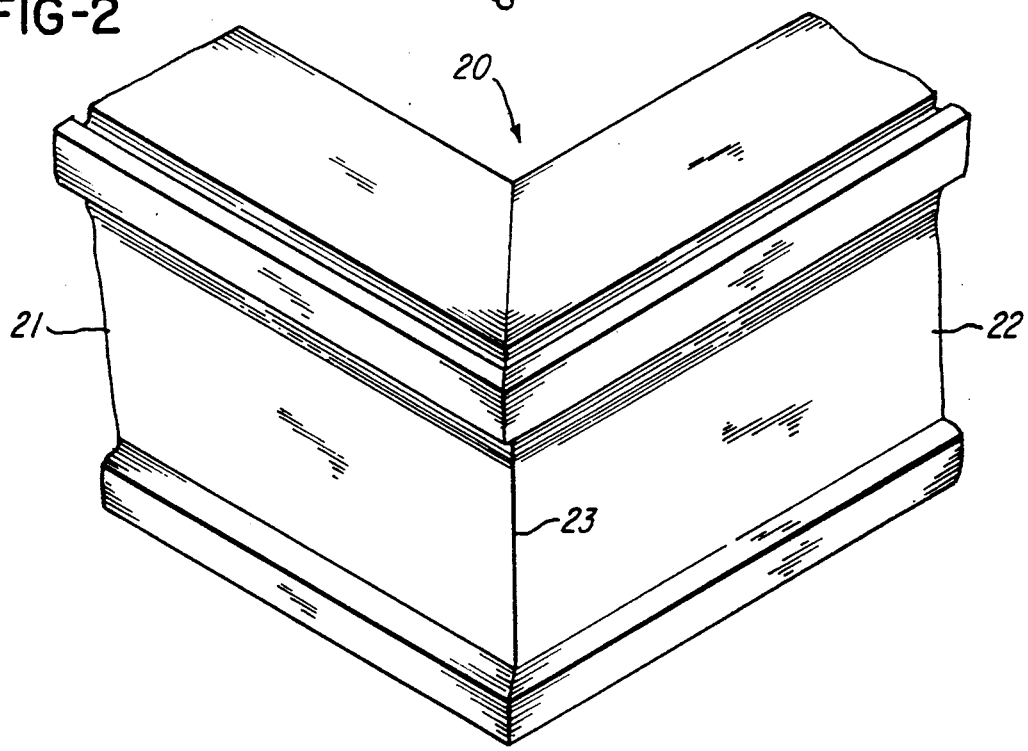
FIG. 2 is a fragmentary isometric view similar to FIG. 1 illustrating a similar pair of members made of thermoplastic material and joined to define a similar corner portion of a window frame and utilizing the apparatus, method, and teachings of this invention to join such members.

Reference is now made to FIG. 2 of the drawings which illustrates one exemplary embodiment of a structure in the form of a window frame structure which is similar to the window frame structure of FIG. 1 and such window frame structure is made utilizing the apparatus and heating device of this invention and such window frame structure is designated generally by the reference numeral 20. The structure 20 is comprised of a pair of members 21 and 22 which are heat fused to define a corner joint 23. As will be readily apparent from the drawings and a comparison of FIGS. 2 and 1, the corner joint 23 is substantially free of flashing and carbonization of plastic material which comprises the members 21 and 22. The frame structure 20 is made utilizing the apparatus, method, and device of this invention and reference is now made to FIG. 3 of the drawings which illustrates one exemplary embodiment of such apparatus and method which utilizes such device and are designated generally by the reference numeral 25.

The apparatus 25 is particularly adapted for joining members made of thermoplastic material and such thermoplastic material is preferably rigid material of any suitable type known in the art and capable of being used for window frames, door frames, and similar constructions. In this presentation of the invention the thermoplastic material will be described as being preferably polyvinyl chloride. The apparatus 25 of this example is particular adapted for joining a plurality of members, shown as a pair of members 21 and 22, and such members have edge means or edges which are to be joined and the edge means is shown as formed or cut edges each designated by the same reference numeral 26 on each of the members 21 and 22.

The apparatus 25 comprises an alignment plate 27 which is adapted to be supported at an alignment position which is illustrated by dotted lines at 30 in FIG. 4, for example, and such apparatus comprises carrier means for the members 21 and 22 and the carrier means will be designated generally by the reference numeral 31 in FIG. 3. The carrier means 31 will be described in more detail subsequently; however, such carrier means enables aligning and clamping of the edge means or edges 26 against the alignment plate 27.

The apparatus 25 also comprises means for withdrawing the plate 27 and such withdrawing means is designated generally by the reference numeral 32 in FIG. 4. Upon withdrawal of the plate 27 using the withdrawing means, a controlled gap is defined between the edges 26 of member 21 and 22 and such gap is designated generally by the reference letter G in FIG. 3 of the drawings.

The apparatus 25 also comprises a device for heating edge means 26 of the members 21 and 22 and such device is best shown in FIG. 4 and is designated generally by the reference numeral 33. The device 33 and hence apparatus 25 (which uses such device) comprises a blade 34 for heating the edge means 26 and also comprises means for heating such blade with such heating means being in the form of heaters 35, which are best illustrated in FIG. 6 of the drawings. The heating means or heaters 35 are particularly adapted to heat blade 34 to a predetermined temperature and means is provided for inserting the blade 34 in the gap G and retracting the same therefrom. The inserting and retracting means for the blade 34 is designated generally by the reference numeral 37 and is best shown in FIGS. 3 and 4 of the drawings.

The apparatus 25 also comprises positioning means for the carrier means 31 and such positioning means is illustrated in the form of a pair of positioning means or actuators for members 21 and 22 and each positioning means is designated by the same reference numeral 41. The positioning means 41 enables urging of the edge means 26 of members 21 and 22 against the blade 34 in a controlled manner to enable heating same and a portion of the members 21 and 22 adjoining such edge means 26 to define plasticized edge portions. The means 37 for inserting and retracting the blade 34 is adapted to retract such blade upon heating the blade and defining such plasticized edge portions.

The positioning means or actuators 41 also serve to move the carrier means carrying members 21 and 22 and their plasticized edge portions against each other in a controlled manner to a preset position to provide heat fusion of members. The carrier means 31 and positioning means 41 are adapted to hold the members 21 and 22 and plasticized edge portions stationary at the said preset position while allowing cooling and solidification thereof.

In accordance with the teachings of this invention the device 33 and hence apparatus 25 further comprises means for shielding the plasticized edge portion 26 from ambient air during the urging and moving of the members 21-2. The shielding means is designated generally by the reference numeral 44 (FIG. 4) and the shielding action provided thereby of shielding the plasticized edge portions from ambient air enables fusion of the plasticized edge portions with minimum flashing and carbonization of the said thermoplastic material from which the members 21 and 22 are made or which comprises such members.

Referring again to FIG. 4, it is seen that the shielding means 44 comprises means for flowing an inert gas environment around the plasticized edge portions of the members and comprises a substantially U-shaped support 45 for the blade 34 and the flowing means comprises manifold means 46 in the support 45 and a plurality of ports, each designated by the reference numeral 47 in FIGS. 4 and 6, which communicate with the manifold means 46. Each port 47 has an inlet 50 communicating with the manifold means 46 as shown in FIG. 4 for certain representative ports 47 and each port 47 has an outlet 51 sized to flow the inert gas comprising the shielding means on opposite sides of the blade 34 with the blade installed in its U-shaped support 45. The manner in which the outlet of each port 47 is constructed and arranged to flow inert gas on opposite sides of the blade 34 will be readily apparent from a typical port in FIG. 6 which shows outlet portions 52 and 53 of a typical outlet 51 of a port 47 on opposite sides of the blade 34.

The shielding means 44 further comprises a source of inert gas under pressure and such inert gas source is shown schematically and designated generally by the reference numeral 54 in FIG. 4 of the drawings and conduit means shown by dotted lines 55 connecting the manifold means or manifold 46 to the source 54 of inert gas under pressure.

Although any suitable inert gas may be utilized for the purpose of providing shielding to enable fusion of the plasticized edge portions with minimum flashing and carbonization of the thermoplastic material comprising the members 21 and 22, in this example of the invention the preferred inert gas is argon and is of a type which is commercially available for various purposes.

The conduit means 55 connecting the pressurized source of argon gas 54 to the manifold means or manifold 46 may be made of any suitable material known in the art and it will be appreciated that the portions of such conduit means adjoining the U-shaped support are preferably made of flexible materials and are of sufficient length to enable movement of the blade from its retracted position of FIG. 4 to its extended position of FIG. 8 wherein the blade 34 is inserted in position in the gap G so that upon urging the edge means or edges 26 of members 21 and 22 thereagainst, such edge means will be heated in a controlled manner, and as previously described.

The various connections for the conduit means 55, materials, etc., may be of any suitable type known in the art and to enable flow of inert gas into the manifold means 46 and through the ports 47 in a controlled manner. It will also be appreciated that a suitable flow and pressure regulator 56 is provided for controlling the argon gas flowing from the source 54 through the conduit means 55 to the manifold means.

The U-shaped support 45 of device 33 is preferably a support made of any suitable heat conductive material and the heat conductive material in this example of the invention is preferably in the form of copper, or the like.

As previously mentioned, the device 33 of apparatus 25 has blade 34 for heating the previously described formed edge means or miter cut edges 26 of members 21 and 22 and heaters 35 are provided and adapted to heat the blade 34 to a predetermined temperature to enable heating of the edge means and the portions of the members adjoining the edge means upon urging such edge means against the blade 34. This action enables the plasticized edge portions to be defined and such edge portions are adapted to be joined by fusion upon moving same against each other and allowing cooling thereof. The heating means or heaters 35 of the device 33 are preferably in the form of electrical resistance heaters which heat the blade 34 and thus the edge means 26 and portions of members 21 and 22 adjoining the edge means 26 to a temperature substantially greater than the usual predetermined temperature usually employed in manufacture of window frames, door frames, and the like utilizing thermoplastic material. The substantially greater temperature coupled with the utilization of shielding means enables faster fusion of the members 21 and 22 with minimum flashing and carbonization as previously mentioned.

The shielding means 44 comprising the device 33 and the utilization of the ports 47 constructed and arranged with their outlet portions 52 and 53 as described before enable flowing of inert gas parallel to the opposite sides 60 and 61 (FIG. 6) of the blade 34 and around the plasticized edge portions of the members 21 and 22 with the members in position, as shown in FIG. 7, to define the inert gas environment therearound. The inert gas environment is characterized by a constant fresh flow of inert gas displacing the usual or normal ambient air around the junction of edges 26. This inert gas flow also assures that impurities, or the like, will not be retained in the area of the fused joint defined by compressing the plasticized edge portions 26 of the members 21 and 22 together.

The electrical resistance heaters 35 of device 33 are suitably electrically connected by electrical leads 63 (FIG. 3) to a source of electrical power which is indicated schematically by a rectangular block 64 and a suitable electrical control means 65 may be provided in the electrical lines 63 for controlling the heating means or electrical resistance heaters 35 so they are heated based on their design and electrical characteristics to enable heating of the blade 34 by conduction through the conductive copper comprising the U-shaped support 45 to thereby enable heating of the blade to any desired temperature and preferably to a temperature generally of the order of 600° F. to 700° F. This temperature is obviously generally of the order of several hundred degrees greater than the roughly 250° F. temperature often previously used in joining prior art structures; and, such roughly 250° F. temperature is considered in this disclosure as the so-called predetermined temperature. It will be appreciated that the heating means or heaters 35 controlled by their electrical controls 65 are able to heat the blade 34 and thus the edge means 26 and the portions of the members 21 and 22 adjoining such edge means to a temperature (600° F. to 700° F.) which is substantially greater than the above-mentioned predetermined temperature.

To assure optimum thermal and electrical insulation for blade 34, the device 33 utilizes guide means which may be made of any suitable material such as ceramic material; and, such guide means comprises a pair of oppositely disposed supporting guides each designated by the same reference numeral 66 in FIG. 6 of the drawings. The material comprising the guides 66 is also preferably an anti-friction material which provides the electrical and thermal insulation referred to above. The device 33 also employs suitable electrical insulating means for its heaters 35.

As previously mentioned, the apparatus 25 has carrier means designated generally by the reference numeral 31 and the carrier means is particularly adapted to enable aligning and clamping of the edge means 26 of the members 21 and 22 against the alignment plate 27. The carrier means comprise a pair of carrier assemblies or carriers each designated generally by the same reference numeral 70 in FIGS. 3 and 5 of the drawings and each assembly carries an associated member 21 or 22.

Referring now to FIG. 5, the carrier 70 which carries the member 21 will be described in detail, with it being understood that the description for member 21 is fully applicable to the other carrier 70 for member 22. Each carrier 70 comprises an approximately U-shaped support 71 which is supported for reciprocating rectilinear movement along an associated rectilinear path designated by double arrows 72 in FIG. 3 of the drawings. As best seen in FIG. 5 each support 71 is supported on an L-shaped structure 73 which in turn is supported on a base plate 74 of apparatus 25. The support 73 preferably has a pair of rail-like members 75 preferably fixed thereto and such members are received within associated rectangular slots 75 in the support member 71.

The members 75 enable movement of the support 71 in a reciprocating manner along the path 72 while holding support 71 and member 21 carried thereby in a precise path. The carrier 70 also comprises a suitable fixture block 77 which has a cross-sectional configuration particularly adapted to receive and support in precise nested relation its associated member 21 or 22 (21 in this description); and, the fixture block 77 is detachably held in position by any suitable means known in the art. In this example of the invention, block 77 for member 21 is held in position by magnets 80 fixed to the fixture block 77. The magnets 80 are magnetically attracted to the L-shaped support 71, which is made of a suitable magnetic material, and hold the fixture block 77 and member 21 in position in the manner illustrated in FIG. 5. It will be appreciated that the base plate 74 is suitably supported in a horizontal position in any suitable manner known in the art.

Each carrier 70 has clamping means designated generally by the reference numeral 79 which comprises a clamping mechanism which in this example is an air cylinder 81 (FIG. 5). The air cylinder 81 is suitably detachably fastened to its associated support 71 at 82 and each clamping air cylinder 81 has a rod 83 extending therefrom provided with an enlarged clamping end 84 which has a friction gripping pad 85 suitably fixed to its terminal outer end. The clamping air cylinder 81 is particularly adapted to clamp its member 21 or 22 (21 in this illustrated example) on the carrier 70 against its support 71 at the desired position; and, preferably this is achieved by placing the edge means or edge 26 against the alignment plate 27 with the member 21 in position on its fixture block 77 and support 71 and then actuating the clamping air cylinder 81 to hold the member 21 in position. A similar procedure would be used to clamp member 22 in position.

Each clamping cylinder 81 has the usual piston therein suitably operatively connected to its piston rod 83 and is provided with air from a suitable pressure source of any type known in the art through a conduit 86 and a control mechanism 87 for controlling air pressure to the air cylinder 81 and porting of air under pressure to opposite sides of the piston within the clamping cylinder as is known in the art so as to extend and retract and rod 83 to provide clamping and release of member 21.

Thus, it is seen that the carrier means 31 for the members 21 and 22 comprise the two carriers 70 and each of the carriers enables aligning and clamping of the edge means of the members against the alignment plate and each carrier 70 includes clamping means 79 including clamping air cylinder 81 and its associated structure.

The apparatus 25 also comprises positioning means for the carrier means 31 and in particular comprises positioning means or actuators 41 for each of the carriers 70. As illustrated in FIGS. 3 and 5, each positioning means or actuator 41 is suitably operatively connected to an associated carrier 70 by an L-shaped structure which is designated generally by the reference numeral 90 and is suitably fastened to an associated support 71 by any suitable means, such as by welding, or the like. The L-shaped structure 90 has an integral upstanding member 91 which is adapted to have an associated actuator 41 suitably operatively connected thereto and as will be described subsequently.

Each positioning means 41 (FIG. 3) may be of any suitable type known in the art and in this example comprises a fluid operated actuator in the form of an air cylinder 92. The air cylinder 92 is provided with air from any suitable pressure source through a conduit 93 and a pressure regulating and control mechanism 94 which enables air to be ported on opposite sides of a movable piston within the air cylinder 92 and as is known in the art so as to extend and retract an associated rod 95 extending from the operating end thereof. The rod 95 has a yoke-like member 96 which is adapted to be disposed around an associated upstanding member 91 of an associated structure 90. A pin 97 (FIGS. 3 and 5) is utilized to connect the bifurcated end 96 extending from the rod 95 to the upstanding member 91 and the pin extends through associated aligned openings in the member 91 and the end 96 and such aligned openings are designated generally by the reference numeral 100 in FIG. 5.

The air cylinders 92 of positioning means 41 are suitably detachably fastened on their support members 73 and the L-shaped structures 90 extend through elongated slots 101 in the supports 71 and as illustrated in FIG. 5 for the structure associated with member 21. Depending upon the operation of the control 94 provided on each cylinder 92, each carrier 70 may be moved by its positioning means 41 and its cylinder 92 along its path 72 in an unobstructed and controlled manner.

The apparatus 25 has means for inserting the blade 34 through the gap G and means for retracting same therefrom and, as previously mentioned, such inserting and retracting means is designated generally by the reference numeral 37. The means 37 in this exemplary embodiment of the invention comprises actuating means in the form of an actuator 102 (FIG. 4). The actuator 102 may be suitably supported on the base plate 74 by a pair of supports 103 at opposite ends thereof and such actuator 102 is preferably detachably fixed to the supports 103. The actuator 102 may be in the form of a fluid operated actuator such as an air cylinder which is provided (FIG. 3) with air from a suitable pressure source through a conduit 104 and a control device 105 for controlling flow of pressurized air into the air cylinder and to opposite sides of the piston comprising the air cylinder. The piston has a piston rod 106 extending therefrom and such rod has a threaded end 107 (FIG. 4) threadedly fastened to the U-shaped support 45 of the device 33. The inserting and retracting means 37 is used to insert and retract blade 34 into the gap G, as previously mentioned.

As previously described, the alignment plate 27 is used to align the edge means 26 of the members 21 and 22 and, in this example of the apparatus and method of this invention, the plate 27 is disposed for reciprocating vertical up and down movement as shown by the double arrow 110 in FIG. 4 of the drawings. The inserting and withdrawing means 32 comprises a fluid operated actuator such as an air cylinder 111. The air cylinder 111 is supplied with air under pressure through a conduit 112 from a suitable pressure source (not shown) and has control means 113 which controls the flow of air and the pressure of such air to a piston (not shown) within such air cylinder 111 so as to advance and retract a piston rod 114 extending from the operating end of the air cylinder 111. The rod 114 is suitably fastened to a plate support 115 which carries the plate 27. A suitable highly stable support structure 116 is provided to assure precise vertical movement of the plate 27.

The plate support structure comprises support rods shown in this example as four column-like rods 117, and four column-like guide rods 120. The plate 27 extends vertically through a suitable slot 121 in the base plate 74 and, upon actuating the air cylinder 111 to extend its piston rod 114 therefrom, the plate support 115 is moved from the solid line position of FIG. 4 to the dotted line position of such FIG. as shown at 124 whereby the plate 27 is moved vertically to the dotted line position illustrated in FIG. 4. Thus, it is seen that upon actuating the air cylinder 111 of the extending and withdrawing means 32 the rod 114 is extended and the plate support 115 is also moved simultaneously.

The movement is provided in a controlled and precise manner by the use of the guide rods 120; and, such movement is achieved by utilization of antifriction sleeves 125 which are fixed to the plate support 115. The sleeves 125 are particularly adapted to slide in a precise and antifriction manner along their rods 120. Thus, actuation of the air cylinder 111 of means 32 provides movement of the rod 114 in its extending direction to provide movement of the plate support 115 and the plate is guided in a precise manner by its sleeves 125 along the guide rods 120.

The blade 34 is preferably made of any suitable material known in the art which is capable of being heated and cooled repeatedly. The blade 34 of this example is preferably made of cobalt steel and sold under the name of Inco 718 by Atek Metals, Inc. of 10052 Commerce Park Drive, West Chester, Ohio. The blade 34 has a thickness generally of the order of 0.030 inch. The blade 34 is also preferably ground and polished to a surface finish generally of the order of 0.05–0.10 microns.

The blade 34 may also be coated by thermospraying, or like process, with a suitable protective and anti-stick composition comprised of chromium oxide-silica composite powder, or equivalent. The purpose of such coating is to prevent thermoplastic material from adhering to the blade 34.

The apparatus 25 may be controlled with control means of any suitable type known in the art to provide automatic, semiautomatic, or basically manual operation as desired. However, regardless of the type of operation, it will be appreciated that the members 21 and 22 which are to be heat fused are preferably provided with suitable edge means and, in this example of the invention, such edge means are defined as 45° miter cut edges. The members 21 and 22 are then disposed in the apparatus 25 each on its associated carrier 70 and each with its edge means 26 against the alignment plate 27. Each member 21 and 22 is then clamped in position with its associated clamping air cylinder 81.

At this point the members 21 and 22 are in position to be fused and are ready for the fusing operation. The plate 27 is then withdrawn by operation of the air cylinder 111 of withdrawing means 32 leaving the gap G which is generally of the order of 0.100 inch between the edge means or mitered corner edges 26.

The device 33 is then operated utilizing the air cylinder 102 of the inserting and retracting means 37 whereupon the heated blade 34 is moved into the gap G and simultaneously therewith the shielding means is operated whereupon the flow of inert gas commences through the manifold means 46 and ports 47. The positioning means or actuators 41 are then actuated in a simultaneous manner pushing the edge means against the heated blade 34 to define the plasticized edge portions. The magnitude of the force which is utilized is generally of the order of several pounds (which may range from 4 to 12 pounds) and preferably is generally of the order of 8 pounds. As the blade 34 is withdrawn in a comparatively rapid manner, the thermoplastic material comprising the members 21 and 22 is fused behind the blade as it is withdrawn.

The rate of withdrawal of the blade 34 is determined experimentally and will vary with the mass of the material to be fused. However, it will be appreciated that the heated thermoplastic material comprising the plasticized edge portion will be pulled by the blade 34 behind such blade as it is withdrawn or moved whereby very little flashing is created on edges 26 as they are brought into fusion contact. Once the heated blade has been retracted to its initial starting position, the valve controlling the flow of inert gas comprising the shielding means 44 is closed, the clamping cylinders 81 are released, and the positioning means 41 are returned to their starting positions whereupon the machine is ready for another cycle by disposing another pair of members 21 and 22 which are to be fused in position on their associated carriers 70. The entire cycle, once the members 21 and 22 have been clamped against the plate 27, requires generally of the order of 15 seconds to complete; and, this time cycle of 15 seconds is roughly one-half to one-fourth of the time which would ordinarily be required to fuse members 21 and 22 employing previously known apparatus and methods.

It should be emphasized at this point that previous apparatus and methods not only require more time to fuse a pair of members but there is considerably more carbonization and flashing produced on the mitered fused edges and as shown at 14 in FIG. 1 once fusion is accomplished.

Having completed the above description of the apparatus and method of this invention, the following presentation will now be made to highlight the method steps by which members 21 and 22 made of thermoplastic material may be joined to define a fused joint and such steps comprise forming edge means or edges 26 on the members 21 and 22, aligning and clamping the edge means and members against the alignment plate 27, withdrawing the plate 27 to define the control gap G therebetween, heating the blade 34 to the predetermined temperature and inserting same in the gap, urging the edge means or miter edges 26 against the blade 34 in a controlled manner to heat same and portions of the members adjoining the edge means to define plasticized edge portions (as previously described) and then retracting the blade 34, moving the members 21 and 22 to place the plasticized edge portions 26 against each other in a controlled manner to a preset position to to provide fusion thereof. The above-mentioned preset position refers to and is controlled by the extent to which the members 21 and 22 and their carriers 70 are moved by the positioning means 41. Members 21 and 22 with their plasticized edge portions are held stationary at the preset position to allow cooling and solidification thereof; and, the cooling is normally achieved utilizing ambient air. It will be appreciated that the cooling may be accelerated by circulating air (cooled or ambient) around members 21 and 22 once the blade 34 has been withdrawn.

In accordance with the teachings of this invention, a shielding of the plasticized edge portions from ambient air is provided during the above-mentioned urging and moving steps and such shielding is achieved by flowing inert gas so as to envelop the blade 34 and the plasticized edge portions during such urging of the edges 26 against the blade and the moving of the members as set forth in the moving step. The flow of inert gas displaces ambient air and provides the shielding inert gas environment enabling fusion of the plasticized edge portions with minimum flashing and carbonization of the thermoplastic material.

It should be emphasized that the retracting and moving steps, namely the retracting of the heated blade 34 and the moving as produced by the positioning means 41, as shown respectively by arrows 130 and 131 in FIG. 9, are achieved in a substantially simultaneous manner such that parts of the plasticized edge portions are moved in fusion contact with each other while other parts of the plasticized edge portions are still against the heated blade. The hot blade 34 thus provides a wiping action against the plasticized edge portions immediately before they are brought into contact with each other whereby a high strength fused joint is provided and the use of inert gas shielding assures minimum flashing. The flow of inert gas through ports 47 and their outlets 52 and 53 is such that the inert gas flows parallel to the opposite surfaces 60 and 61 of the blade 34 so as to displace ambient air away from such opposite surfaces 60 and 61 and to provide the inert gas shielding means defined by the inert gas environment.

In this disclosure of the invention various prime movers such as actuators or cylinders have been described as being fluid operated or air operated cylinders, and the like. However, such actuators may be operated utilizing any suitable means known in the art and may be in the form of air operated actuators, hydraulic actuators, electrical actuators, or in any combination thereof.

It will be appreciated by those skilled in the art that each of the actuators will be provided with means for actuating same from any suitable source and in the case of air actuators may be provided with the usual shop air, or the like, through suitable air pressure regulators. Further suitable controls may be provided to provide either fully automatic or semiautomatic operation of the entire apparatus and method of this invention after placement of members 21 and 22 on their carriers 70. The controls for apparatus 25 whether for automatic or basically manual operation may be of any suitable type known in the art and may utilize suitable electrical and fluid circuits, control panels, switches, etc.

In this disclosure of the invention, terms such as vertical, horizontal, up, down, and the like have been used throughout. It will be appreciated that these terms and similar terms are used in connection with the relative arrangement of components as illustrated in the drawings; however, such terms are not to be considered as limiting the scope of this invention in any way.

Thus, it is seen from the foregoing specification and accompanying drawings that this invention provides a new method and apparatus for joining members made of thermoplastic material and a new device which may be used with such apparatus and method, whereby the device, apparatus, and method of this invention enable joining of members made of thermoplastic material in an efficient and high strength manner not possible with previous devices, apparatus and methods.

Reference is made in this specification to the joining of members 21 and 22 made of thermoplastic material such as polyvinyl chloride and certain time cycles, forces, temperatures, etc., have been presented. However, it is to be understood that the time cycles, temperatures, and the like may be varied as required based upon the composition, mass, and construction of the members being joined. Further, members may be joined by heat fusion as taught herein which are made of any suitable thermoplastic material capable of being used for structures such as door frames, window frames, and like structures.

While the forms and method of this invention now preferred have been illustrated and described as required by the Patent Statute, it is to be understood that other forms and method steps can be utilized and fall within the scope of the appended claims wherein each claim sets forth what is believed to be known in each claim prior to this invention in the portion of each claim that is disposed before the words "the improvement" and sets forth what is believed to be new in each claim according to this invention in the portion of each claim that is disposed after the words "the improvement" whereby it is believed that each claim sets forth novel, useful, and unobvious invention within the purview of the Patent Statute.

What is claimed is:

1. An apparatus for joining members made of thermoplastic material and having an edge means to be joined formed on said members, said apparatus comprising,
   an alignment plate adapted to be supported in an alignment position,
   carrier means enabling aligning and clamping said edge means and members against said alignment plate,
   means for withdrawing said plate to define a controlled gap therebetween,
   a blade for heating said edge means,
   means for heating said blade to a predetermined temperature,
   means for inserting said blade in said gap and retracting same therefrom,
   positioning means for said carrier means enabling urging of said edge means against said blade in a controlled manner to enable heating same and portions of said members adjoining said edge means and defining plasticized edge portions,
   said means for inserting and retracting being adapted to retract said blade upon heating said blade and defining said plasticized edge portions,
   said positioning means also serving to move said carrier means and members and their plasticized edge portions against each other in a controlled manner to a preset position to provide fusion thereof, and
   said carrier means and positioning means being adapted to hold said members and plasticized edge portions stationary at said preset position while allowing cooling and solidification thereof,
   means for shielding said plasticized edge portions from ambient air during said urging and moving, said shielding means including means for flowing an inert gas environment around said plasticized edge portions,
   said means for shielding from ambient air enabling fusion of said plasticized edge portions with minimum flashing and carbonization of said thermoplastic material, and
   further comprising
   a substantially U-shaped support for said blade and
   said flowing means comprises manifold means in said support and a plurality of ports communicating with said manifold means, each of said ports having an inlet communication with said manifold means and an outlet sized to flow said inert gas on opposite sides of said blade with said blade installed in said support.

2. An apparatus as set forth in claim 1 further comprising
   a source of inert gas under pressure and
   conduit means connecting said manifold means to said source of said inert gas.

3. An apparatus as set forth in claim 2 wherein said blade is made of a material adapted to be heated and cooled repeatedly while retaining its structural integrity.

4. An apparatus as set forth in claim 1 wherein said support is made of a heat conductive material and said heating means comprises electrical resistance heater means.

5. An apparatus as set forth in claim 4 wherein said support is comprised of copper.

6. A device for joining, by fusion, a first member and a second member, both of said members being discrete, thermoplastic members, said members being characterized in that they are capable of being joined by fusion when heated to a predetermined temperature,
   said device comprising
   a support,
   means for mounting said members on said support with opposed surfaces of said members in spaced relation from each other,
   a blade,
   means for heating said blade to a temperature substantially greater than said predetermined temperature,
   means for moving said blade between the spaced surfaces of said spaced, thermoplastic members to elevate the temperature of the opposed members to a fusion temperature.
   means for urging said thermoplastic members against said blade, then withdrawing said blade and urging said opposed surfaces into fusion engagement with each other and cooling said members to form a joint therebetween, said substantially greater temperature of said blade enabling faster fusion of said members with a minimum flashing, shielding means for directing an inert gas parallel to opposite sides of said blade and between said opposed surfaces to define an inert gas environment between the opposed surfaces of said thermoplastic members as the blade is moved therebetween and as the blade is withdrawn, the introduction of inert gas minimizing the flashing at the joint between said members and providing a high strength joint between said members, said flowing means comprises manifold means in said support and a plurality of ports communicating with said manifold means, each of said ports having inlet means communicating with said manifold means and outlet means adapted to flow said inert gas on opposite sides of said blade with said blade installed in said support, said shielding means comprising manifold means in said support and a plurality of ports communicating with said manifold means, each of said ports having inlet means communicating with said manifold means and outlet means adapted to direct said inert gas on opposite sides of said blade with said blade installed in said support.

7. A device as set forth in claim 6 and further comprising control means for controlling the flow of said inert gas to said manifold means and a control for controlling said heating means to enable heating of said blade to said temperature substantially greater than said predetermined temperature.

* * * * *